US012560996B2

(12) United States Patent
Traynor et al.

(10) Patent No.: US 12,560,996 B2
(45) Date of Patent: Feb. 24, 2026

(54) ARTIFICIAL INTELLIGENCE (AI)-ASSISTED AND DYNAMIC RIDE PROFILE HEAD TRACKING SYSTEMS AND METHODS

(71) Applicant: Universal City Studios LLC, Universal City, CA (US)

(72) Inventors: Mark James Traynor, Orlando, FL (US); Robert Michael Jordan, Orlando, FL (US); Patrick John Goergen, Orlando, FL (US); David Smith, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/814,128

(22) Filed: Aug. 23, 2024

(65) Prior Publication Data

US 2024/0419240 A1    Dec. 19, 2024

Related U.S. Application Data

(63) Continuation of application No. 18/090,101, filed on Dec. 28, 2022, now Pat. No. 12,079,384.

(60) Provisional application No. 63/333,382, filed on Apr. 21, 2022.

(51) Int. Cl.
*G06F 3/01* (2006.01)
*A63G 31/16* (2006.01)
*G06N 20/00* (2019.01)

(52) U.S. Cl.
CPC ............. *G06F 3/012* (2013.01); *A63G 31/16* (2013.01); *G06F 3/013* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,322,353 B1 | 6/2019 | Goergen et al. | |
| 10,366,642 B2 | 7/2019 | Reichow et al. | |
| 10,650,552 B2 | 5/2020 | Woods et al. | |
| 10,652,522 B2 | 5/2020 | Siegel et al. | |
| 10,699,485 B2 | 6/2020 | Zielkowski | |
| 2015/0363976 A1 | 12/2015 | Henson | |
| 2018/0255285 A1* | 9/2018 | Hall | H04N 13/344 |
| 2018/0300897 A1 | 10/2018 | Woods et al. | |
| 2020/0098190 A1 | 3/2020 | Goergen et al. | |

(Continued)

FOREIGN PATENT DOCUMENTS

WO         2020163801 A      8/2020

OTHER PUBLICATIONS

PCT/US2023/018853 International Search Report and Written Opinion mailed Jun. 29, 2023.

*Primary Examiner* — Stephen T. Reed
(74) *Attorney, Agent, or Firm* — Fletcher Yoder P.C.

(57)    ABSTRACT

A ride system may include a ride vehicle that supports a passenger and an attention tracker to determine a current direction of attention of the passenger. The ride system may also include a control system for maintaining an environment of the passenger. Maintaining the environment may include determining a set of content to be incorporated into the environment based at least in part on the current direction of attention as well as a future direction of attention that is determined utilizing a machine learning algorithm.

19 Claims, 7 Drawing Sheets

(56) References Cited

U.S. PATENT DOCUMENTS

| 2020/0294264 | A1 | 9/2020 | Pan et al. |
| 2020/0364940 | A1 | 11/2020 | Coup et al. |
| 2022/0083132 | A1 | 3/2022 | Hare et al. |

* cited by examiner

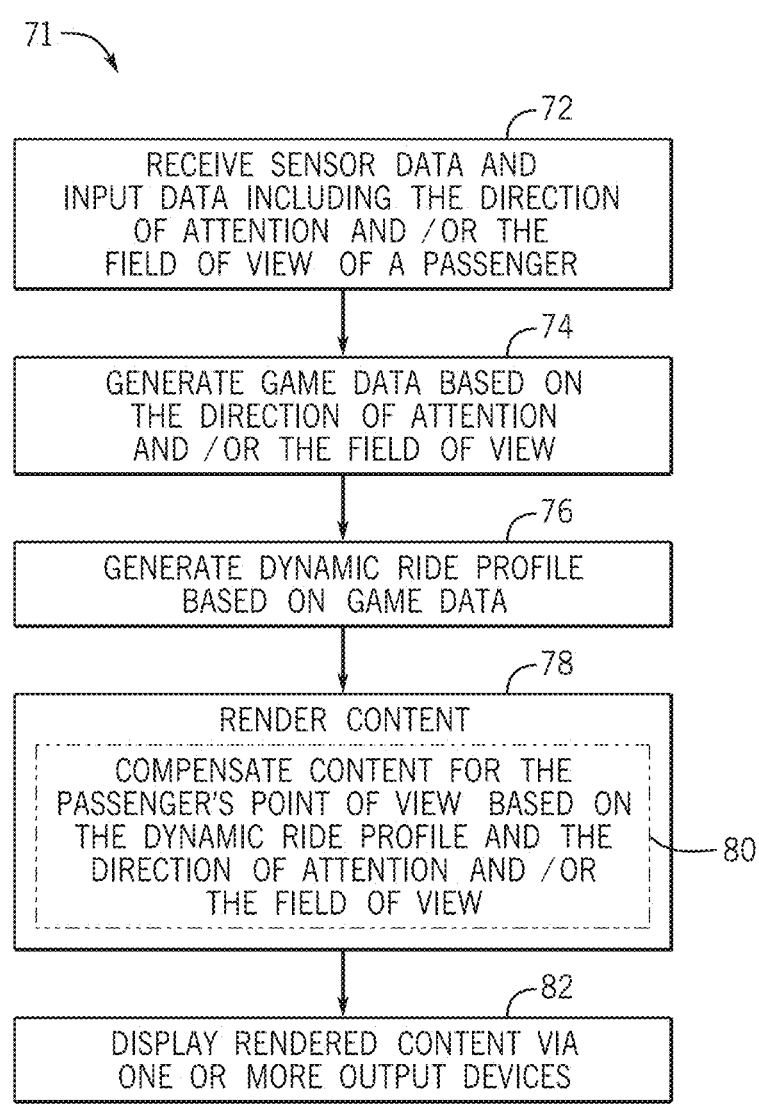

71 ⟍

72

RECEIVE SENSOR DATA AND
INPUT DATA INCLUDING THE DIRECTION
OF ATTENTION AND /OR THE
FIELD OF VIEW OF A PASSENGER

74

GENERATE GAME DATA BASED ON
THE DIRECTION OF ATTENTION
AND /OR THE FIELD OF VIEW

76

GENERATE DYNAMIC RIDE PROFILE
BASED ON GAME DATA

78

RENDER CONTENT

COMPENSATE CONTENT FOR THE
PASSENGER'S POINT OF VIEW BASED ON
THE DYNAMIC RIDE PROFILE AND THE
DIRECTION OF ATTENTION AND /OR
THE FIELD OF VIEW

80

82

DISPLAY RENDERED CONTENT VIA
ONE OR MORE OUTPUT DEVICES

FIG. 6

ARTIFICIAL INTELLIGENCE (AI)-ASSISTED AND DYNAMIC RIDE PROFILE HEAD TRACKING SYSTEMS AND METHODS

CROSS-REFERENCE TO RELATED APPLICATIONS

This application is a continuation application of U.S. patent application Ser. No. 18/090,101, entitled "ARTIFICIAL INTELLIGENCE (AI)-ASSISTED AND DYNAMIC RIDE PROFILE HEAD TRACKING SYSTEMS AND METHODS," and filed Dec. 28, 2022, which claims priority to and the benefit of U.S. Provisional Application No. 63/333,382, entitled "ARTIFICIAL INTELLIGENCE (AI)-ASSISTED AND DYNAMIC RIDE PROFILE HEAD TRACKING SYSTEMS AND METHODS," filed Apr. 21, 2022, both of which are hereby incorporated by reference in their entireties for all purposes.

BACKGROUND

The present disclosure relates generally to amusement park-style rides/attractions, and more specifically to systems and methods for tracking, predicting, and/or utilizing head and/or eye movement in amusement park-style rides/attractions.

Various amusement rides have been created to provide passengers with unique motion and visual experiences. For example, theme rides can be implemented with single-passenger or multi-passenger ride vehicles that travel along a fixed or variable path. Ride vehicles themselves may include features providing passengers with varying levels of control (e.g., various buttons and knobs) over the ride vehicle and/or surrounding environment. However, traditional controls given to passengers of a ride vehicle are generally limited when the ride vehicle follows a predetermined, fixed path.

Additionally, in fixed or variable path ride vehicles, as well as simulated ride vehicles, digital and/or physical content may be rendered or actuated, respectively, to add to the experience of the passenger(s). For certain amusement park rides, vehicle movements and such content rendering/actuation may be constrained to pre-programmed profiles (e.g., animations), such as embedded in a programmable logic controller (PLC) of the vehicle. However, it is presently recognized that these programmed profiles are substantially static and, as such, are not updated or modified based on passenger interactions with the vehicle and/or based on realistic physics models. As a result, a passenger of the ride may feel like the ride is staged or unrealistic, which may limit passenger engagement and amusement.

Additionally, it is also recognized that as passengers experience a ride/attraction, where the passenger focuses their attention (i.e., where a passenger is looking) may vary throughout the ride/attraction. Accordingly, it is now recognized that, when a ride utilizes pre-programmed profiles to determine and generate a passenger's experience irrespective of the passenger's direction of attention, this can limit the ride's ability to immerse a passenger in an experience that feels true to a realistic physics model.

The above background section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a ride system may include a ride vehicle that supports a passenger and an attention tracker to determine a current direction of attention of the passenger. The ride system may also include a control system for maintaining an environment of the passenger. Maintaining the environment may include determining a set of content to be incorporated into the environment based on the current direction of attention.

In an embodiment, a method may include determining a first direction of attention of a first passenger at a first time during a first ride session of a ride system and training an artificial intelligence (AI) algorithm to predict a future direction of attention of a second passenger based on the first direction of attention of the first passenger. Additionally, the method may include determining a second direction of attention of the second passenger at a second time during a second ride session of the ride system and estimating, via the AI algorithm, the future direction of attention of the second passenger based on the second direction of attention of the second passenger. Additionally, the method may include determining whether to limit the rendering of content, of a set of content generated for the second passenger, based on the estimated future direction of attention.

In an embodiment, a method may include receiving input data, associated with one or more input devices of a ride vehicle, such as a direction of attention of a passenger of the ride vehicle. The method may also include generating a virtual environment associated with the passenger based at least in part on the input data. Content of the virtual environment may be determined based on the direction of attention. The method may also include rendering a first portion of the virtual environment and displaying a second portion of the rendered first portion of the virtual environment based on a point-of-view of the passenger relative to an axis of the ride vehicle.

DRAWINGS

These and other features, aspects, and advantages of the present disclosure will become better understood when the following detailed description is read with reference to the accompanying drawings in which like characters represent like parts throughout the drawings, wherein.

Figure 7:
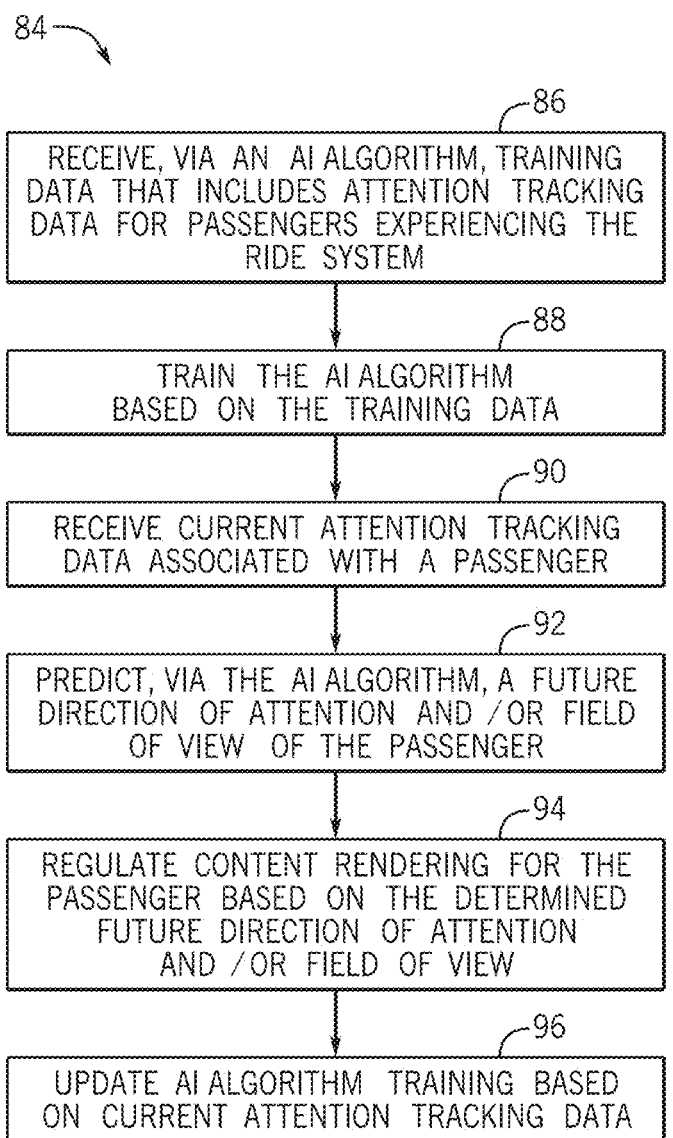

FIG. 6 is a flowchart of an example process for generating and displaying content based on the direction of attention and/or the field of view of a passenger, in accordance with embodiments of the present disclosure; and FIG. 7 is a flowchart of an example process for utilizing an artificial intelligence algorithm to anticipate the direction of attention and/or the field of view of a passenger and regulate content rendering based thereon, in accordance with embodiments of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As should be appreciated, various amusement rides have been created to provide passengers with unique motion and visual experiences. For example, amusement rides can be implemented with single-passenger or multi-passenger ride vehicles that travel along a fixed or variable path. Ride vehicles themselves may include pre-programmed profiles and/or features providing passengers with varying levels of control (e.g., various buttons and knobs) over the ride vehicle and/or surrounding environment. However, even with certain degrees of passenger control, the pre-programmed profiles may appear substantially static. As a result, a passenger of the ride may feel like the ride is staged or unrealistic, which may limit passenger engagement and amusement. As such, to heighten passenger engagement and amusement, a dynamic ride profile based on a combination of sensed parameters, physics models, game feedback, and passenger interactions may be utilized to render content and adjust the movement of the ride vehicle. As such, the dynamic ride profile enables the ride to provide realistic simulation movements and digitally rendered content that improve passenger engagement and amusement.

Present embodiments are generally directed to amusement park-style rides/attractions that utilize tracking and/or the prediction of head and/or eye movement to improve content rendering efficiency and/or alter/vary a dynamic ride profile of the ride/attraction. In general, as passengers experience a ride/attraction, where the passenger focuses their attention (i.e., where a passenger is looking) may vary throughout the ride/attraction. As such, in some embodiments, passenger interactions and effects on the dynamic ride profile may go beyond typical passenger controls, such as buttons, levers, and/or interactive handheld devices, to also include the direction of attention and/or field of view of the passenger(s). For example, the motion of the ride vehicle and/or content (e.g., digital content and/or physical content) depicted within or around the ride vehicle may be generated or actuated based on where the attention of a passenger is focused. In some embodiments, the ride vehicle, surroundings, and/or devices possessed by the passenger (e.g., headsets, glasses, handheld devices, etc.) may include one or more head-tracking and/or eye-tracking sensors (e.g., attention trackers) to estimate a passenger's direction of attention and/or field of view. The attention trackers may be coupled to a dynamic control system to generate the dynamic ride profile.

In some embodiments, the content of the dynamic ride profile may be adjusted based on the passenger's direction of attention to compensate for warps, obscurations, and/or other point-of-view distortions such that the content appears realistic/immersive to the passenger. Additionally or alternatively, the passenger's direction of attention may be used to alter what content (e.g., the subject matter or placement thereof) is generated/displayed to the passenger. Furthermore, the motion of the ride vehicle may be adjusted based on the passenger's direction of attention either directly (e.g., as a direct cause thereof) or indirectly (e.g., based on altered content that is based on the passenger's direction of attention).

Additionally or alternatively, in some embodiments, the passenger's direction of attention may be used to regulate digital content rendering and/or physical content actuation such that processing time and/or activation energy is not wasted on content that will not be observed (e.g., outside of the passenger's field of view). For example, if a passenger's direction of attention is pointed in a first direction, content related to the ride profile (e.g., dynamic, static, or other ride profile) and located in a second direction that would not be viewable within the passenger's field of view may be ignored during rendering (i.e., not rendered) to conserve processing power/bandwidth and/or energy. Furthermore, in some embodiments, the content regulation may be independent of or determined in conjunction with the dynamic ride profile (which may also be determined based on the passenger's direction of attention). For example, the regulation of content rendering may be performed regardless of what content the ride profile contains and regardless of whether the passenger's direction of attention determined the subject matter or location of the content (e.g., such as in a dynamic ride profile).

Furthermore, in some embodiments, artificial intelligence (AI) algorithms such as machine learning algorithms, deep learning algorithms, artificial neural networks (ANN), etc. may be used to predict where a passenger's direction of attention will be focused in real-time based on historical data and/or current head and/or eye position data. For example, head-tracking and/or eye-tracking may be performed over a training period and/or throughout the life of a ride system to train an AI algorithm to predict where a passenger is likely to be looking at any point in time (e.g., a current/real-time point in time) or on average during operation of the ride system. Moreover, the predicted direction of attention may be used to enhance and/or speed up processing that is reliant upon the passenger's direction of attention such as generation of the dynamic ride profile and/or regulation of content rendering. For example, the ride system may pre-process future content based on the predicted direction of attention to reduce or eliminate lag times associated with processing. Additionally or alternatively, processing associated with content in certain areas, relative to the passenger's position, that are not likely to be seen by the passenger may be reduced based on the passenger's predicted direction of attention and/or field of view.

Figure 1:
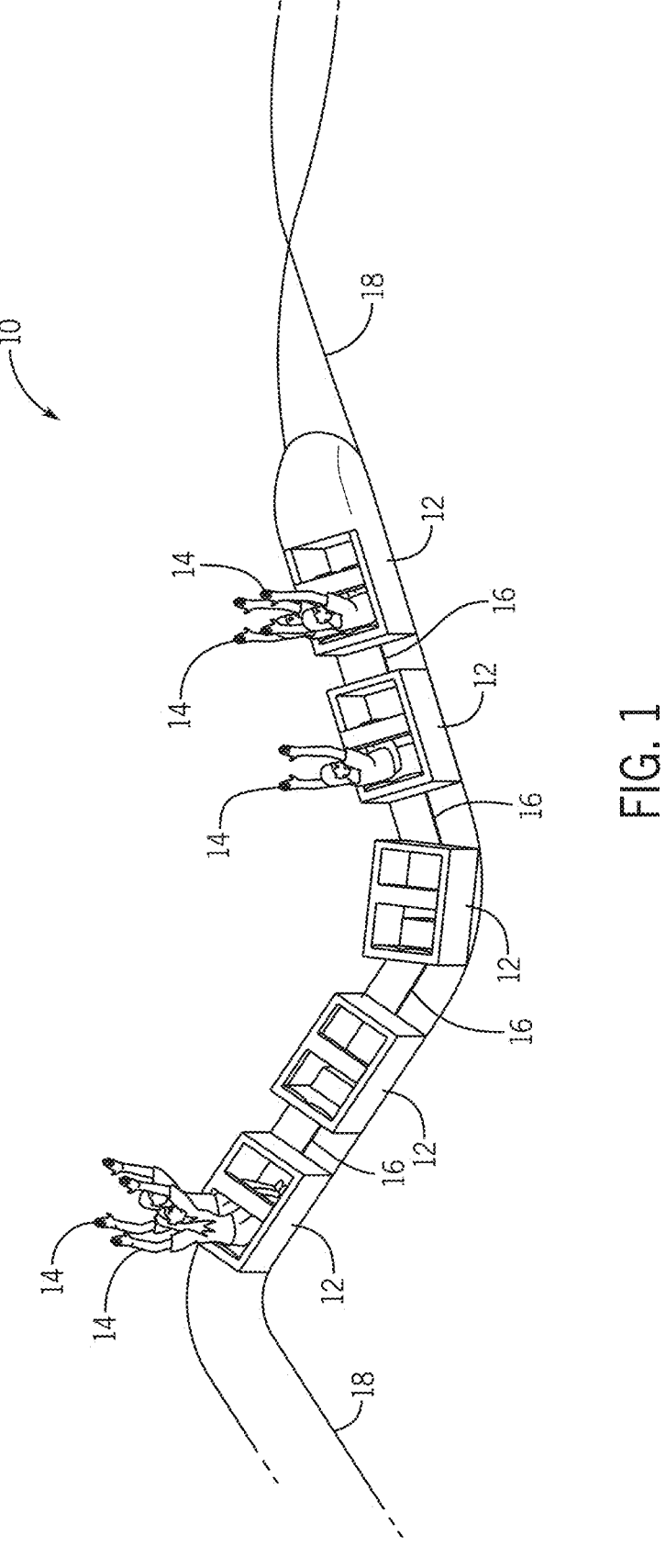
FIG. 1 is a perspective view of a ride system including a ride vehicle, in accordance with embodiments of the present disclosure.

With the foregoing in mind, FIG. 1 is a perspective view of an embodiment of a ride system 10. The ride system 10 may include one or more ride vehicles 12 that hold one or more passengers 14. In some embodiments, multiple ride vehicles 12 may be coupled together (e.g., by a linkage 16). In some scenarios, the ride vehicle 12 may travel along a ride path 18 during operation of the ride system 10. The ride path 18 may be any surface on which the ride vehicle 12 travels. For example, the ride path 18 may be defined by a track, a gimbal system, enclosed or pre-defined area, etc. The ride path 18 may or may not dictate the path traveled by the ride vehicle 12. In some embodiments, the ride path 18 may control the movement (e.g., direction, speed, and/or orientation) of the ride vehicle 12 as it progresses along the ride path 18, similar to a train on tracks. In another embodiment, another system may control the path taken by the ride vehicle 12 during operation of the ride system 10. For example, the ride path 18 may be an open surface that allows the passengers 14 to control certain aspects of the movement of the ride vehicle 12 via an interface system of the ride vehicle 12. Furthermore, in some embodiments, the ride vehicles 12 may remain stationary relative to a geographic position and articulate on one or more axes. As such, the ride path 18 may be virtual, and the ride vehicle 12 articulated to simulate motion within or on the ride path 18. As should be appreciated, the ride system 10 may include any suitable number of ride vehicles 12, and each ride vehicle 12 may accommodate any suitable number of passengers 14.

It should be appreciated that the embodiment of the ride system 10 illustrated in FIG. 1 is a simplified representation intended to provide context and facilitate discussion of the presently disclosed techniques. Other embodiments of the ride system 10, including the ride vehicle 12, the ride path 18, and so forth, may include similar and/or different elements or configurations. For example, while the illustrated embodiment depicts the ride vehicles 12 traveling along the ride path 18 that is positioned beneath the ride vehicles 12, other embodiments of the ride system 10 may include ride vehicles 12 that are suspended from a ride path 18 positioned above the ride vehicles.

Figure 2:
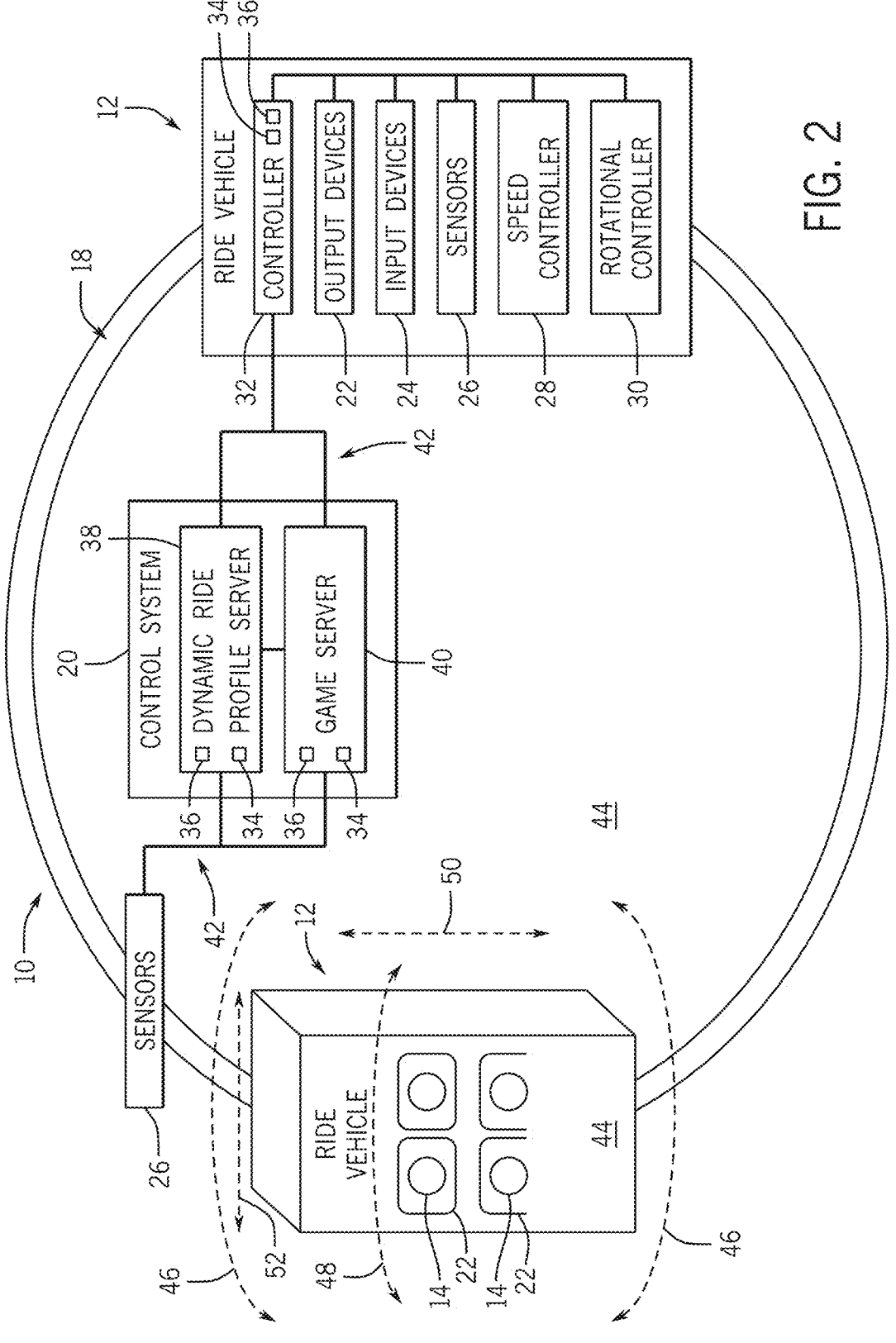
FIG. 2 is a hybrid schematic and block diagram of the ride system of FIG. 1 with the ride vehicle coupled to a control system, in accordance with embodiments of the present disclosure.

FIG. 2 is a hybrid schematic and block diagram representation of a ride system 10 including a ride vehicle 12 coupled to a control system 20. Each ride vehicle 12 may include a number of output devices 22, a number of input devices 24, one or more sensors 26, and/or one or more controllers. For example, the controllers may include but are not limited to one or more movement controllers (e.g., a speed controller 28 and rotational controller 30) and/or a main controller 32 such as programmable logic controller (PLC). As should be appreciated, each controller may include individual or shared processor circuitry 34 and memory 36. Moreover, the sensors 26 may include positional sensors (e.g., proximity detectors, radio-frequency identification (RFID) sensors, cameras, light detection and ranging (LIDAR) sensors), velocimeters, accelerometers, gyroscopes, revolutions per minute (RPM) sensors, voltage/current sensors, or any other suitable sensor capable of measuring a parameter of the vehicles 12, the passengers 14 (e.g., head or eye movement), and/or the ride system 10. Moreover, the sensors may be located within the ride vehicle 12 or at a position external to the ride vehicle 12, such as on or alongside the ride path 18.

In some embodiments, the output devices 22 may include any suitable number of displays (e.g., mounted to the interior of the vehicles, head-mounted displays), speakers, haptic feedback devices (e.g., rumble/vibration feedback devices, acoustic or ultrasonic haptic devices), physical effects devices (e.g., devices that generate hot or cold bursts of air, devices that generate bursts of mist). Moreover, in some embodiments, the output devices 22 may entirely or partially surround the passenger(s) such as to provide a more immersive experience. Additionally or alternatively, the output devices 22 may be disposed external to the ride vehicle 12. As should be appreciated, each of the ride vehicles 12 may include other suitable output devices 22, or other combinations of output devices 22, in conjunction with the present disclosure.

Furthermore, the input devices 24 may include buttons (e.g., ignition buttons), steering devices (e.g., steering wheels, joysticks), control pedals (e.g., brake pedals, accelerator pedals, clutch pedals, etc.), knobs, levers, (e.g., gear shifts, brake levers, etc.), or other physical media. Additionally or alternatively, the input devices 24 may include head and/or eye tracking systems that monitor the passenger's head and/or eye position to determine a direction of attention and/or field of view. As should be appreciated, each of the ride vehicles 12 may include other input devices 24, or other combinations of input devices 24, in conjunction with the present disclosure. In certain embodiments, each of the passengers 14 may have a respective set of input devices 24, while in other embodiments, each of the passengers 14 may have complementary portions of input devices 24 (e.g., that are used in a cooperative manner) or shared input devices 24.

Additionally, the ride system 10 may include a control system 20 for controlling movement of the ride vehicle 12 in accordance with a dynamic ride profile, as discussed in greater detail below. More specifically, the illustrated control system 20 includes a dynamic ride profile server 38, a game server 40, and may be communicatively coupled to the controller 32 of the ride vehicle 12 (e.g., via a network 42). As should be appreciated, the network 42 may utilize any suitable wired or wireless connection to provide communications between the ride vehicle 12 and the control system 20.

The game server 40, as used herein and as discussed in greater detail below, refers to a computing device or a collection of computing devices (e.g., physical computing devices or virtual computing nodes) generally responsible for managing a video "game" aspect of the ride system 10. As such, the game server 40 may be programmed to generate a virtual environment (e.g., a virtual 3D space) in which virtual vehicles are designed to move. Moreover, the virtual vehicle, as used herein, refers to a video game entity or element of the virtual environment that has particular attributes (e.g., speed, position, health/damage, fuel, appearance) that are maintained by the game server 40. For example, a virtual vehicle may be associated with a physical ride vehicle 12. In certain embodiments, additional virtual vehicles (e.g., non-playable characters/vehicles) may be present within the virtual environment as well.

In some embodiments, passengers 14 may be presented with an augmented or completely virtual environment 44 including digital and/or physical content within or external to the ride vehicle 12. For example, in some embodiments, the ride system 10 may be a racing simulator, and, as such, the game server 40 may generate and maintain a virtual environment that represents the nature of the race track that virtual vehicles are traversing, the relative speed and position of the virtual vehicles, interactions between the virtual vehicles, attributes (e.g., performance upgrades, health, bonuses, scores, etc.) associated with the virtual vehicles, and so forth. The game content may be generated and/or altered based on a pre-designed program (e.g., the overarching "game") as well as inputs from the input devices 24 and/or sensors 26. Furthermore, the game content (e.g., video content, audio content) delivered to the ride vehicles 12 may be output by the output devices 22 to yield at least a portion of the environment 44 that is presented to the passengers 14. For example, in one embodiment, video content presented by display devices of the ride vehicle 12 to a particular passenger 14 includes content, that corresponds to a perspective view of the particular passenger 14, generated within the virtual environment hosted by the game server 40. As should be appreciated, the environment 44 may be a virtual environment (e.g., displayed entirely via digital media), a physical environment (e.g., physical and/or mechanical surroundings), or a combination thereof (e.g., a virtually augmented physical environment).

The dynamic ride profile server 38, as used herein and as discussed in greater detail below, refers to a computing device or a collection of computing devices (e.g., physical computing devices or virtual computing nodes) generally responsible for determining how the physical ride vehicle 12 should move based on a number of different input data and one or more physics models. As discussed, the input data may include information received from the game server 40 that indicates or describes what is happening to each corresponding virtual vehicle in the virtual environment, such as how the virtual vehicles respond to textures or interactions within the game. For example, inclines of a race track, environmental hazards (e.g., rain, standing water, ice), and interactions between virtual vehicles may be factored into determining how the ride vehicle 12 should move. Additionally, in certain embodiments, the dynamic ride profile server 38 receives input data from the input devices 24 and/or various sensors 26 of the ride system 10. As discussed below, the dynamic ride profile server 38 provides the received data as inputs to one or more physical models that describe how the physical ride vehicles 12 should move to correspond with what is happening in the environment 44 that is presented to the passengers 14. In this manner, the dynamic ride profile server 38 generates a dynamic ride profile that instructs each of the ride vehicles 12 how to move to match what is being presented to the passengers 14 by the game server 40.

In certain embodiments, the dynamic ride profile server 38 and the game server 40 may be hosted by distinct physical computing devices, or may exist as virtual server instances hosted by a common physical computing device. As should be appreciated, the one or more computing devices that host the dynamic ride profile server 38 and the game server 40 may generally include any suitable memory

36 (e.g., a non-transitory computer readable medium) capable of storing instructions and data, as well as any suitable processing circuitry 34 capable of executing the stored instructions to provide the functionality set forth herein.

It may be appreciated that, in certain embodiments, a ride path 18 may be loosely defined by a set of physical and virtual boundaries, enabling greater freedom of movement for the ride vehicles 12 than a traditional track. Accordingly, in addition to producing effects in the environment 44 that is presented to the passengers 14, the input devices 24 may also trigger real-world effects such as changing the operation (e.g., position, velocity, or orientation) of the vehicles 12 within a predefined set of limits. For example, the dynamic ride profile server 38 may provide control signals to one or more movement controllers (e.g., the speed controller 28 and/or rotational controller 30) to modify vehicle yaw 46, tilt angle 48, ride path location (e.g., displacement 50 along the ride path 18 or lateral displacement 52 with respect to boundaries of the ride path 18), speed (e.g., rate of change in displacement 50 and/or lateral displacement 52), and/or rotational rate (e.g., rate of change in yaw 46 and/or tilt angle 48), or any other suitable parameter of the ride vehicle 12, in accordance with a physics-based dynamic ride profile that takes passenger inputs into account. That is, embodiments of the dynamic ride profile server 38 can provide control signals to modify one or more aspects of a position and/or orientation of the ride vehicle 12 along the ride path 18 along one or more axes (e.g., along six degrees of freedom). This generally enables the ride vehicles 12 to move in a manner that is consistent with what is being presented in the environment 44, producing an immersive experience for the passengers 14.

Figure 3:
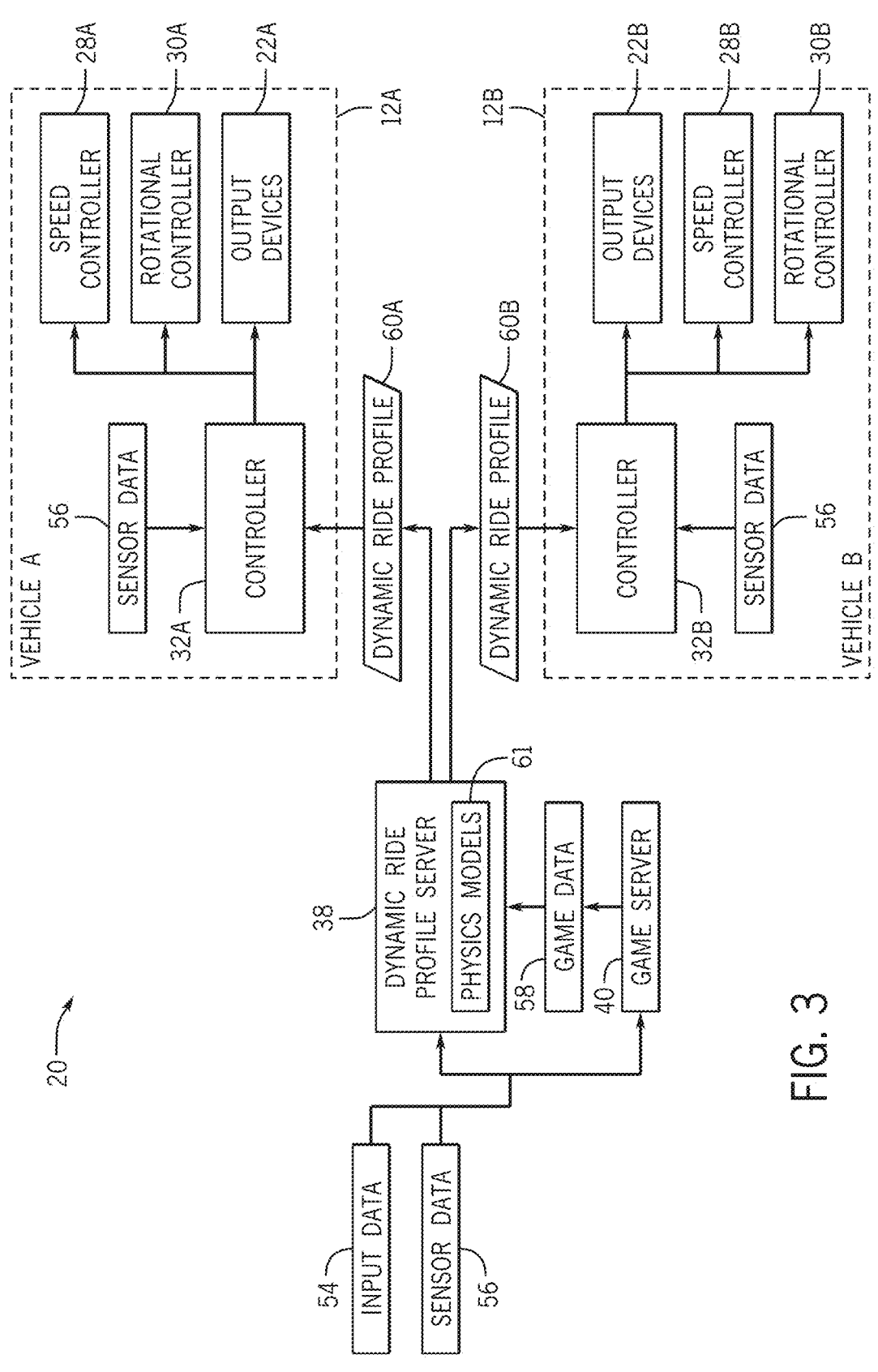
FIG. 3 is a schematic diagram illustrating the flow of information within the control system of FIG. 2 in relation to two ride vehicles, in accordance with embodiments of the present disclosure.

FIG. 3 is a schematic diagram illustrating the flow of information within the control system 20 of FIG. 2 in relation to two ride vehicles 12 (e.g., ride vehicle 12A and ride vehicle 12B). In general, input data 54 (e.g., from input devices 24) and sensor data 56 (e.g., from sensors 26) may be provided to the dynamic ride profile server 38 and/or the game server 40. Moreover, game data 58, generated by the game server 40, may be provided to the dynamic ride profile server 38 to generate different dynamic ride profiles 60A and 60B (cumulatively 60) for different ride vehicles 12A and 12B, respectively. As stated above, the dynamic ride profile server 38 may apply one or more physics models 61 (e.g., stored memory 36) when determining the dynamic ride profile 60. Such physics models 61 may define how virtual vehicles (which correspond to the ride vehicles 12) move through the environment 44, such as along a smooth or laminar path, moving along a bumpy or turbulent path, sliding or drifting, or transitioning between different media (e.g., moving between air and water). The physics models 61 may also include models that describe how two or more virtual vehicles interact with and affect one another (e.g., via drafting, collisions, missile attacks) within the environment 44 that is presented to the passengers 14.

As discussed herein, the control system 20 generates content depicting the environment 44 and determines suitable movements for the ride vehicles 12 that make the ride experience feel like the vehicles are actually moving through the environment 44. For example, the output devices 22 may provide audio/visual information (e.g., video content, sound effects, music, virtual reality (VR) content, augmented reality (AR) content) pertaining to the video game aspect of the ride system 10 and the ride vehicle 12 may move accordingly. Additionally, the control system may receive input from the input devices 24 and/or sensors 26, and, in response, update the content presented to the passengers 14 accordingly. In other words, the content and movements may be based on input data and/or sensor data representative of a disposition of the ride vehicle 12 and/or a passenger's actions or disposition.

Figure 4:
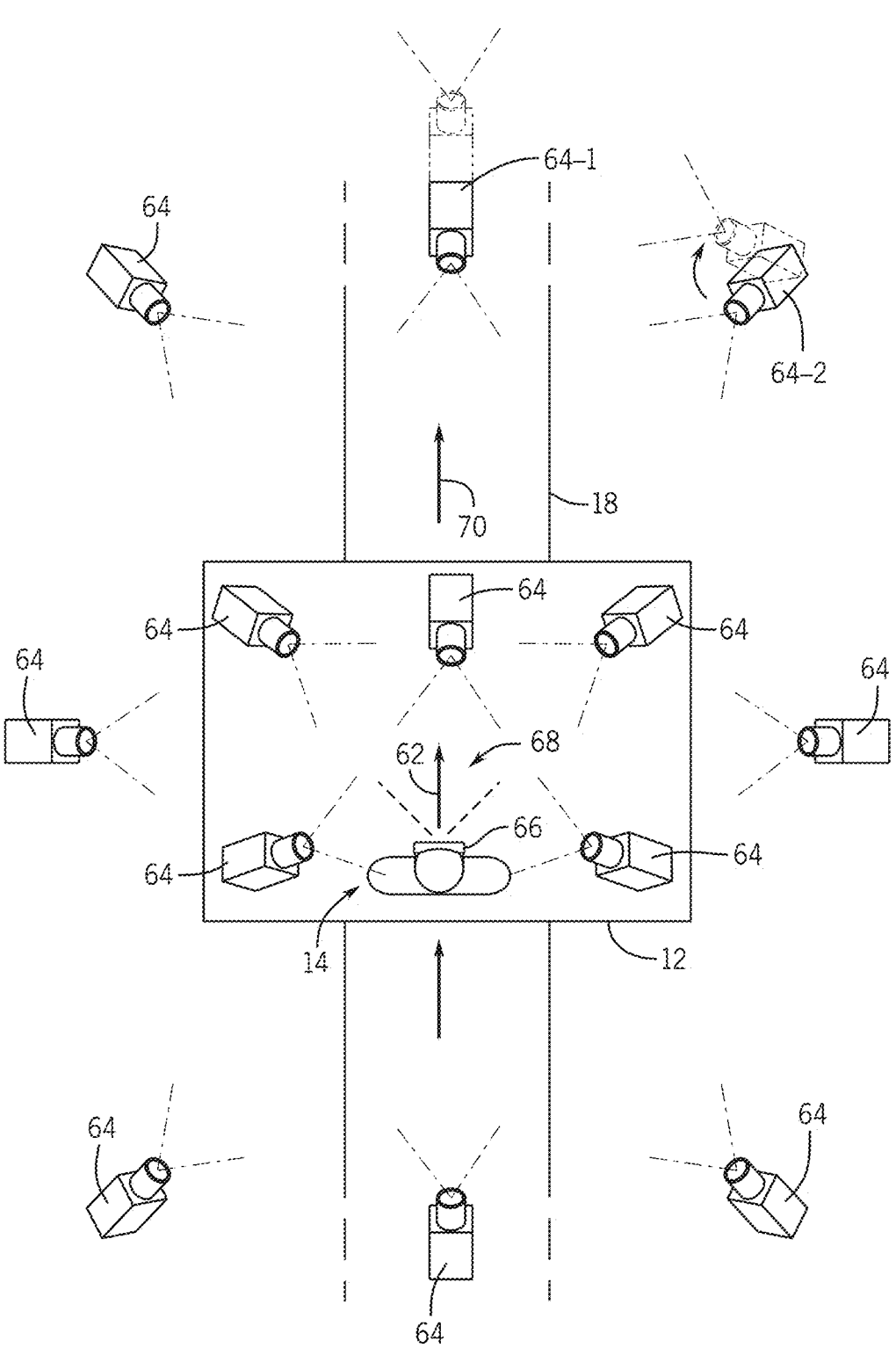
FIG. 4 is a top view of the ride vehicle of FIG. 1 with one or more attention trackers to determine a direction of attention of the passenger, in accordance with embodiments of the present disclosure.

In particular, a direction of attention 62 of a passenger 14, as shown in FIG. 4, may be utilized to vary or augment the dynamic ride profile 60 of the ride vehicle 12 or a particular passenger's experience within the ride vehicle 12. For example, one or more attention trackers 64 may be disposed within the ride vehicle 12 (e.g., mounted within or on top of the ride vehicle, on a headrest of the ride vehicle, etc.), external to the ride vehicle 12 (e.g., along or beside the ride path 18), and/or worn by the passenger 14 (e.g., via a headset 66). The attention trackers 64 may utilize any suitable type of head and/or eye movement tracking (e.g., via cameras, gyroscopes, accelerometers, etc.) to identify the direction of attention 62 of the passenger(s) 14 and/or the field of view 68 of the passenger(s). Moreover, in some embodiments, a headset 66 (e.g., AR headset, VR headset, 3D glasses, etc.) may be utilized as both an input device 24 (e.g., as an attention tracker 64) and an output device 22 (e.g., to provide, at least in part, content of the environment 44). Furthermore, some attention trackers 64 may include multi-directional trackers 64-1 and/or actuating trackers 64-2, for example, for use with mobile and/or multiple ride vehicles 12. As should be appreciated, the direction of attention 62 and/or field of view 68 may be relative to any suitable axis such as the direction of motion 70 (e.g., virtual motion or physical motion) along the ride path 18, a longitudinal, latitudinal, or vertical axis of the ride vehicle 12, set by the passenger 14, or preset by the ride system 10.

In some embodiments, the direction of attention 62 and/or field of view 68 of a passenger 14 may be tracked (e.g., via one or more attention trackers 64) throughout a ride session (e.g., a period of time that the passenger 14 is engaged with the ride system 10). Furthermore, tracking may be performed continuously throughout the ride session, at pre-defined locations along the ride path 18, at pre-defined locations or events within a virtual aspect of the environment 44, and/or or at periodically in time during the ride session. Additionally or alternatively, tracking may be performed based on a position and/or orientation of the ride vehicle 12. For example, a nominal direction of attention 62 and/or field of view 68 may be derived based on the direction of motion 70 of the ride vehicle 12 and/or an orientation of the ride vehicle 12 relative to the direction of motion 70. Moreover, the nominal direction of attention 62 and/or field of view 68 may be based on a number of and/or placement of passengers 14 within the ride vehicle 12. For example, a ride vehicle 12 with two passengers 14 located on the left side of the ride vehicle 12 may have a more leftward biased direction of attention 62 and/or field of view 68 than a ride vehicle 12 with passengers 14 disposed side-by-side.

Figure 5:
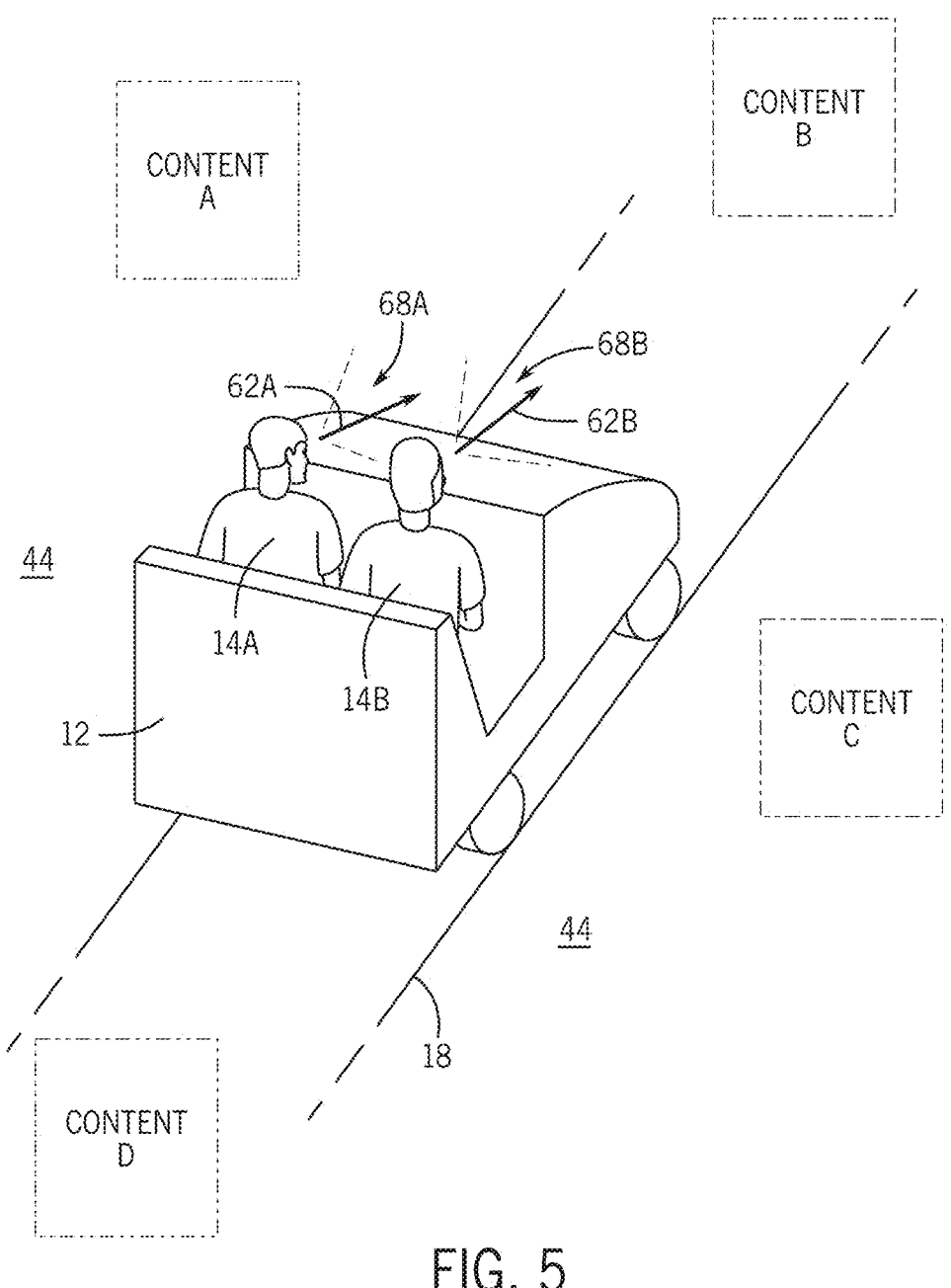
FIG. 5 is a perspective view of the ride vehicle of FIG. 1 surrounded by physical and/or virtual content, in accordance with embodiments of the present disclosure.

As shown in FIG. 5, passengers 14 (e.g., passenger 14A and passenger 14B) may be surrounded by potential content (e.g., content A, content B, content C, and content D) associated with the environment 44. As should be appreciated, the content of the environment 44 may be entirely physical, entirely virtual, or a virtually augmented physical environment 44. As discussed herein, the direction of attention 62 and/or the field of view 68 of the passenger 14 may be utilized in determining what content to generate (e.g., what subject matter is generated by the game server 40 and/or the location of such subject matter within the environment 44), where/how to render the content on the output devices 22 (e.g., based on the point-of-view of the passenger 14 within the environment 44), and/or what content to render (e.g., to reduce rendering by that part of the environment 44 not needed for viewing). Furthermore, as used herein, the directions of attention 62 and/or fields of view 68 may be considered individually or considered as a combined direction/field of view of multiple passengers 14 such as an intersection, addition, average, or other combination of multiple directions of attention 62 and/or fields of view 68. For example, the field of view 68 used in determining what content to generate may be a combined field of view based on the field of view 68A of a first passenger 14A and the field of view 68B of a second passenger 14B. Additionally or alternatively, the direction of attention 62 and/or field of view 68 may include that of a virtual or otherwise assumed passenger such as when the ride vehicle 12 is empty and/or for testing purposes. In some embodiments, the virtual passenger may have a variable or set direction of attention 62 and/or field of view 68, which may be based on or coincide with the direction of travel 70 of the ride vehicle 12.

What content is generated (e.g., by the game server 40) may depend on the direction of attention 62 and/or the field of view 68. For example, if a passenger's direction of attention 62 lingers while aimed at the sky, airplanes or birds that would have otherwise not have been generated during a quick glace towards the sky may be generated to bring more excitement or realism to the sky. In a further example, such as in a thriller or scary amusement ride, a skeleton or ghost (e.g., content A in FIG. 5) may be generated (or actuated in the case of a physical/augmented environment 44) on the edge of a passenger's field of view 68 (e.g., on the edge of the field of view 68A of passenger 14A in FIG. 5) to heighten the thrill when excited from a direction the passenger 14 is not expecting. As such, a passenger 14 may experience the same ride system 10 multiple times and have multiple different experiences based on their direction of attention 62 and/or field of view 68. In other words, depending on the direction of attention 62 and/or the field of view 68, different content may be incorporated into the passenger's experience (e.g., incorporated into the game) that would otherwise have not been utilized or generated.

Additionally or alternatively, a passenger's direction of attention 62 and/or the field of view 68 may dictate where/how digital content is rendered (e.g., via AR, VR, or display screens), relative to the passenger's point-of-view. For example, in FIG. 5, content B may be generally left of center when compared to the point-of-view of passenger 14A and content B may be generally centered when compared to the point-of-view of passenger 14B. Moreover, content C may appear further away for passenger 14A than content A. Additionally or alternatively, such placement of content may also be used in compensating for warps (e.g., lens warps from a headset or display), obscurations (e.g., portions of the ride vehicle 12 or other passengers 14 that are in the way of content), and/or other point-of-view distortions such that the content appears realistic to the passenger 14.

FIG. 6 is a flowchart of an example process 71 for generating and displaying content based on the direction of attention 62 and/or the field of view 68 of a passenger 14. In some embodiments, sensor data 56 and input data 54 (including the direction of attention 62 and/or the field of view 68) may be received (e.g., via the game server 40 and/or the dynamic ride profile server 38) (process block 72). Additionally, game data may be generated based on the direction of attention 62 and/or the field of view 68 (process block 74). For example, the direction of attention 62 and/or the field of view 68 may be utilized to determine what happens in the game and, as such, what the environment 44 will include. Furthermore, a dynamic ride profile 60 may be generated based on the game data (process block 76), and the content may be rendered (process block 78). During rendering, the content may be compensated for the passenger's point-of-view based on the direction of attention 62 and/or the field of view 68 (process block 80). As should be appreciated, while discussed herein as rendering content based on the dynamic ride profile 60, the dynamic ride profile server 38, the controller 32, or a separate processor 34 may be used to render graphical content and/or send control signals to physical content. As such, in some embodiments, rendered content may be transmitted in parallel with the dynamic ride profile 60 (e.g., for controlling ride vehicle movement) to the ride vehicle 12. Finally, the rendered content may be displayed via one or more output devices 22 (process block 82).

Returning to FIG. 5, the direction of attention 62 and/or the field of view 68 may also be used to determine what content associated with the generated game data and environment 44 to render. In the example of FIG. 5, neither passenger 14A/14B can see content D, as it is located relatively away from their respective directions of attention 62A/62B and fields of view 68A/68B. As such, content D may not be rendered. In other words, in response to determining that a passenger 14 will not see particular content, rendering of the particular content may be limited (e.g., not rendered or rendered partially). Partial rendering may include rendering at a reduced resolution and/or a rendering with more detailed aspects removed (e.g., removed clouds from the sky, reduced number of trees in a forest, etc.) from the environment 44.

However, in some scenarios, it may be difficult to render previously non-viewed content in response to a change in the passenger's direction of attention 62 and/or field of view 68. For example, if passenger 14B were to turn around suddenly, content D may or may not have time to render fully before the passenger 14 notices artifacts or a lack of content. As such, an artificial intelligence (AI) algorithm may be utilized to predict the direction of attention 62 and/or field of view 68 of a passenger 14 such that content may be rendered before a passenger looks at it, but the content is allowed to remain unrendered or partially rendered (e.g., to save processing bandwidth and/or power) while it remains unseen. For example, if passengers 14 tend to look behind them at a certain point in the ride, as determined by the AI algorithm, then content D may be rendered and ready during that point in the ride.

In some embodiments, the AI algorithm may be a machine learning algorithm, a deep learning algorithm, an artificial neural networks (ANN), or any other suitable type of AI algorithm. Furthermore, the AI algorithm may be a part of the control system 20 or implemented separately. In some scenarios, training data for the AI algorithm may include attention tracking data from one or more attention trackers 64 obtained throughout (e.g., at periodic points or continuously) the ride session. Moreover, in some scenarios, the training data may be obtained during a learning period, in which all content or preselected portions thereof is rendered while the AI algorithm learns the frequency and/or behavioral characteristics of head and/or eye movements. In some scenarios, the preselected portions of content may be based on the direction of attention 62 and/or field of view 68 of a virtual passenger, which may be based on the direction of motion 70 of the ride vehicle or based on a preset algorithm. Once the AI algorithm has been trained, the AI algorithm may output a predicted direction of attention 62 and/or field of view 68 for each passenger 14, based on the current direction of attention 62 and/or field of view 68, which may be used (e.g., by the AI algorithm, dynamic ride profile server 38, game server 40, controller 32, and/or other processor 34) to determine which content to render. Additionally or alternatively, the AI algorithm may predict or conceptually take into account a combined direction of attention 62 and/or field of view 68 associated with or based on multiple passengers.

In some embodiments, the AI algorithm may predict the direction of attention 62 and/or field of view 68 for a passenger for a preset future period of time (e.g., 0.5 seconds, 1 second, 2 seconds, 5 seconds, 10 seconds, and so on up to the end of the ride session). In other words, the AI algorithm may predict that the passenger's direction of attention 62 and/or field of view 68 will remain within a certain range for an immediate future (e.g., the next 0.5 seconds, 1 second, 2 seconds, 5 seconds, 10 seconds, and so on up to the end of the ride session), and content rendering may be regulated based on the predicted range. For example, if the directions of attention 62A/62B and/or fields of view 68A/68B of the passengers 14A/14B are predicted to vary between content A, content B, and content C, but are predicted to not include content D for a given future period of time, content D may be rendered partially or not rendered at the current time and/or during the given period. As should be appreciated, the immediately future time period may be a sliding window ahead of the current time and/or a time at which the current direction of attention 62 and/or field of view 68 is measured/calculated.

Additionally or alternatively, if it is anticipated (e.g., based on a predicted direction of attention 62 and/or field of view 68) that certain areas of content will not be viewed, the AI algorithm may also be used to regulate the generation of game data 58. For example, more game data content may be generated in highly viewed content areas, and game data content may be relatively sparse in lesser viewed content areas. Such reallocation of game data may allow more interaction or entertainment for passengers 14 without increasing processing bandwidth. Furthermore, a predicted direction of attention 62 and/or field of view 68 may be substituted for the current direction of attention 62 and/or field of view 68 (e.g., as determined based on one or more attention trackers 64) in any of the embodiments discussed herein.

Additionally or alternatively, the learning period may include activation/deactivation of content renderings controlled by the AI algorithm, and the AI algorithm may learn to directly control what content gets rendered and what remains unrendered or only partially rendered (e.g., rendered at a lower resolution or with less content) with or without outputting a predicted direction of attention 62 and/or field of view 68. In other words, the predicted direction of attention 62 and/or field of view 68 may be conceptually used (e.g., to generate changes to the dynamic ride profile 38) without being directly calculated. Moreover, the AI algorithm may also utilize input data 54 from input devices 24 and/or sensor data 56 in conjunction with attention tracking data from one or more attention trackers 64 to update the dynamic ride profile 38 and/or generate the predicted direction of attention 62 and/or field of view 68. As should be appreciated, in some embodiments, the AI algorithm may be constantly or periodically updated based on attention tracking data as the ride system 10 is utilized by more and more passengers 14.

FIG. 7 is a flowchart of an example process 84 for utilizing an AI algorithm to anticipate the direction of attention 62 and/or the field of view 68 of a passenger 14 and to regulate content rendering based thereon. An AI algorithm may receive training data that includes attention tracking data for passengers 14 experiencing the ride system 10 (process block 86). The AI algorithm may then be trained based on the training data (process block 88). The trained AI algorithm may receive current attention tracking data (e.g., input data 54 from an attention tracker 64) associated with a passenger 14 (process block 90). As should be appreciated, the current attention tracking data may include the current direction of attention 62 and/or the current field of view 68 of the passenger 14 and/or the cumulative history of directions of attention 62 and/or fields of view 68 of the passenger 14 during the current ride session. Furthermore, the AI algorithm may predict a future direction of attention 62 or field of view 68 based on the current attention tracking data (process block 92). The AI algorithm or other controller/processor (e.g., the dynamic ride profile server 38, game server 40, controller 32, and/or other processor 34) may regulate content rendering for the passenger 14 based on the determined future direction of attention or field of view (process block 94). As should be appreciated, the AI algorithm may regulate (e.g., determine what content to render, not render, and/or partially render) content rendering directly, based on the current attention tracking data, with or without calculating a value indicative of a predicted direction of attention 62 and/or field of view 68. Additionally, in some embodiments, the AI algorithm may be retrained or updated based on the current attention tracking data (process block 96).

While only certain features have been illustrated and described herein, many modifications and changes will occur to those skilled in the art. It is, therefore, to be understood that the appended claims are intended to cover all such modifications and changes as fall within the true spirit of the disclosure. Furthermore, although the above referenced flowcharts are shown in a given order, in certain embodiments, process blocks may be reordered, altered, deleted, and/or occur simultaneously. Additionally, the referenced flowcharts are given as illustrative tools and further decision and process blocks may also be added depending on implementation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A ride system comprising:
   a ride vehicle configured to support a passenger over a ride period;
   one or more sensors configured to generate sensor data indicative of a current direction of attention of the passenger; and
   a control system configured to:
      determine the current direction of attention of the passenger based on the sensor data;
      utilize a machine learning algorithm to estimate a future direction of attention of the passenger for at least a portion of the ride period based at least in part on the current direction of attention; and maintain an environment of the passenger, wherein maintaining the environment comprises determining a change to a set of content of the environment based at least in part on the future direction of attention, wherein the change to the set of content comprises an addition of or elimination of an object or effect from the set of content.

2. The ride system of claim 1, wherein the one or more sensors comprises one or more cameras, one or more accelerometers, or both.

3. The ride system of claim 1, wherein the future direction of attention comprises a range of directions associated with a portion of time in an immediate future during the ride period, and wherein the current direction of attention is representative of at least a portion of a current field of view of the passenger or at least a portion of a current combined field of view of the passenger and a second passenger of the ride vehicle.

4. The ride system of claim 1, wherein the environment comprises physical media disposed along a ride path of the ride vehicle, a virtual environment displayed via one or more display screens, or both the physical media and the virtual environment.

5. The ride system of claim 1, wherein maintaining the environment comprises:
   rendering a first portion of the set of content to be incorporated into the environment; and
   displaying the rendered first portion of the set of content.

6. The ride system of claim 5, wherein maintaining the environment comprises not displaying a second portion of the set of content.

7. The ride system of claim 6, wherein the first portion of the set of content is within a field of view of the passenger corresponding to the future direction of attention, and the second portion of the set of content is outside of the field of view of the passenger.

8. The ride system of claim 1, wherein the future direction of attention comprises a range of directions associated with a portion of time in an immediate future during the ride period, and wherein the current direction of attention is representative of at least a portion of a current field of view of the passenger or at least a portion of a current combined field of view of the passenger and a second passenger of the ride vehicle.

9. The ride system of claim 1, wherein the control system is configured to train the machine learning algorithm based on previously determined directions of attention of one or more previous passengers during one or more previous ride periods.

10. The ride system of claim 9, wherein the control system is configured to retrain the machine learning algorithm based on the current direction of attention of the passenger during the ride period.

11. A ride system comprising:
   a ride vehicle configured to support a passenger over a ride period;
   one or more sensors configured to generate sensor data indicative of a current direction of attention of the passenger; and
   a control system configured to:
      determine the current direction of attention of the passenger based on the sensor data;
      utilize a machine learning algorithm to estimate a future direction of attention of the passenger for at least a portion of the ride period based at least in part on the current direction of attention; and
      maintain a digital environment of the passenger by:

selecting a first portion of the digital environment to render based on the future direction of attention;

selecting a second portion of the digital environment to display based on the future direction of attention; or both.

12. The ride system of claim 11, comprising one or more digital displays, wherein the control system is configured to maintain the digital environment by:

selecting a first portion of digital content of the digital environment to render;

selecting a second portion of the first portion of the digital content to display; and facilitating, via the one or more digital displays, display of the second portion of the digital content as the digital environment.

13. The ride system of claim 12, wherein the control system is configured to maintain the digital environment by selecting a third portion of the first portion of the digital content to not display, wherein the second portion of the first portion of the digital content is within a field of view of the passenger corresponding to the future direction of attention, and wherein the third portion of the first portion of the digital content is outside of the field of view of the passenger corresponding to the future direction of attention.

14. The ride system of claim 11, wherein the future direction of attention comprises a range of directions associated with a portion of time in an immediate future during the ride period, and wherein the current direction of attention is representative of at least a portion of a current field of view of the passenger or at least a portion of a current combined field of view of the passenger and a second passenger of the ride vehicle.

15. The ride system of claim 14, wherein the control system is configured to train the machine learning algorithm based on previously determined directions of attention of one or more previous passengers during one or more previous ride periods.

16. The ride system of claim 11, wherein the passenger comprises a person or a virtual passenger.

17. A method comprising:

generating, via one or more sensors, sensor data indicative of a current direction of attention of a passenger of a ride system;

determining, via control circuitry of the ride system, the current direction of attention of the passenger based on the sensor data;

utilizing, via the control circuitry, a machine learning algorithm to estimate a future direction of attention of a passenger for at least a portion of a ride period based at least in part on the current direction of attention; and maintaining, via the control circuitry, a digital environment of the ride system, wherein maintaining the digital environment comprises:

rendering a first portion of the digital environment based on the future direction of attention;

displaying a second portion of the digital environment based on the future direction of attention; or both.

18. The method of claim 17, wherein the machine learning algorithm is trained based on training data comprising a plurality of directions of attention of a plurality of previous passengers determined over a plurality of previous ride sessions of the ride system.

19. The method of claim 18, comprising retraining the machine learning algorithm based on the current direction of attention of the passenger during the ride period.

* * * * *